United States Patent
Kim

(10) Patent No.: US 10,558,633 B1
(45) Date of Patent: Feb. 11, 2020

(54) HASH-VALUE-BASED SINGLE-PASS DATA STORE STATISTICS COLLECTION

(71) Applicant: Teradata US, Inc., Dayton, OH (US)

(72) Inventor: Sung Jin Kim, Buena Park, CA (US)

(73) Assignee: Teradata US, Inc., San Diego, CA (US)

( * ) Notice: Subject to any disclaimer, the term of this patent is extended or adjusted under 35 U.S.C. 154(b) by 974 days.

(21) Appl. No.: 14/984,211

(22) Filed: Dec. 30, 2015

(51) Int. Cl.
*G06F 16/22* (2019.01)
*G06F 16/2453* (2019.01)

(52) U.S. Cl.
CPC .... *G06F 16/2255* (2019.01); *G06F 16/24542* (2019.01)

(58) Field of Classification Search
None
See application file for complete search history.

(56) References Cited

U.S. PATENT DOCUMENTS

| | | | |
|---|---|---|---|
| 7,778,996 B2* | 8/2010 | Burger | G06F 17/30536 707/713 |
| 9,870,398 B1* | 1/2018 | Kim | G06F 17/30469 |
| 2016/0357674 A1* | 12/2016 | Waldspurger | G06F 12/0893 |

\* cited by examiner

*Primary Examiner* — Amresh Singh
(74) *Attorney, Agent, or Firm* — Randy L. Campbell, Jr.

(57) ABSTRACT

A data store system includes a processor that may generate a hash value based on a hash function for each column value in a selected column of a data store table and may select a first domain and a second domain of hash values. The processor may determine a frequency value for each hash value within the first domain, generate a unique identifier for each hash value within the second domain, and determine at least one statistic on the selected column based on the frequency values and the unique identifiers. The processor may store the at least one statistic for use in a query plan. A method and computer-readable medium may also be implemented.

20 Claims, 6 Drawing Sheets

| HASH VALUE 402 | FREQUENCY 404 | FP VALUE 406 |
|---|---|---|
| HV1 | FREQ(HV1) | FP(HV1) |
| HV2 | FREQ(HV2) | FP(HV2) |
| ⋮ | ⋮ | ⋮ |
| HV$n$ | FREQ(HV$n$) | FP(HV$n$) |

| HASH VALUE 502 | FREQUENCY 504 |
|---|---|
| HV1 | FREQ(HV1) |
| HV2 | FREQ(HV2) |
| ⋮ | ⋮ |
| HV$k$ | FREQ(HV$k$) |

FIG. 6

| HASH VALUE RANGE GROUP 602 | RANGE GROUP FREQUENCY 604 |
|---|---|
| HV-RG1 | FREQ-RG1 |
| HV-RG2 | FREQ-RG2 |
| ⋮ | ⋮ |
| HV-RGm | FREQ-RGm |

HASH-VALUE-BASED SINGLE-PASS DATA STORE STATISTICS COLLECTION

BACKGROUND

Data stores systems, such as database and file systems, store vast amounts of logically related data in the form of data tables. Queries may be used to perform various utilities and analytics on the data tables to generate desired results. Query planning typically relies on various statistics regarding the contents of the data tables. Statistics determined on columns of data tables, and in particular, the column data values stored in the columns of data tables play a crucial role in query planning. A data store system may rely on these statistics to determine an optimal query execution plan. Some valuable statistics may include the number of unique values (NUV) in a column and the high mode frequency (HMF), which is the highest frequency of a value in a column. The collection of NUV and HMF values may require the underlying data to be sorted on disks because all unique values and their frequencies cannot be stored in a buffer while the data is scanned due to the overwhelming size. Sorting on disks makes the entire statistics collection process expensive from a system resource perspective. Some implementations have provided users with an option to collect statistics from randomly sampled rows or data blocks. This approach can reduce the cost, but the accuracy of estimates is often poor against a "skewed dataset", which may cause overestimation or underestimation issues. These poor estimates cause the optimization process to result in non-optimal plans such that workload execution suffers from performance degradation. A "single-pass" approach may allow each column value of a column under analysis to be analyzed without the aforementioned disk-sorting. However, due to the unpredictability of column values within a column under analysis, determining statistics may prove overly burdensome. Thus, it would be desirable to allow the single-pass approach to be implemented with a finite range of values representative of the column values of a column under analysis.

SUMMARY

According to one aspect of the present disclosure, a data store system may include an array of persistent storage devices configured to store a plurality of data store tables. The data store system may further include a processor in communication with the array of persistent storage devices. The processor may select a column of a data store table for statistics collection. The processor may generate a hash value based on a hash function for each column value in the selected column. The processor may select a first domain of hash values and a second domain of hash values. The second domain may be a subset of the first domain. The processor may determine a frequency value for each generated hash value within the first domain. The processor may generate a unique identifier for each hash value that is within the second domain. The processor may determine at least one statistic on the selected column based on the frequency values and the unique identifiers. The processor may store the at least one statistic for use in a query plan.

According to another aspect of the present disclosure, a method may include selecting a column of a data store table for statistics collection. The method may further include generating a hash value based on a hash function for each column value in the selected column. The method may further include selecting a first domain of hash values and a second domain of hash values. The second domain may be a subset of the first domain. The method may further include determining a frequency value for each generated hash value within the first domain. The method may further include generating a unique identifier for each hash value that is within the second domain. The method may further include determining at least one statistic on the selected column based on the frequency values and the unique identifiers. The method may further include storing the at least one statistic for query planning.

According to another aspect of the present disclosure, a computer-readable medium encoded with a plurality of instructions executable by a processor. The plurality of instructions may include instructions to select a column of a data store table for statistics collection. The plurality of instructions may further include instructions to generate a hash value based on a hash function for each column value in the selected column. The plurality of instructions may further include instructions to select a first domain of hash values and a second domain of hash values. The second domain may be a subset of the first domain. The plurality of instructions may further include instructions to determine a frequency value for each generated hash value within the first domain. The plurality of instructions may further include instructions to generate a unique identifier for each hash value that is within the second domain. The plurality of instructions may further include instructions to determine at least one statistic on the selected column based on the frequency values and the unique identifiers. The plurality of instructions may further include instructions to store the at least one statistic for query planning.

BRIEF DESCRIPTION OF THE DRAWINGS

The present disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is an example of hash value frequency buffer.

FIG. 5 is an example of another hash value frequency buffer.

FIG. 6 is an example of a hash value frequency range group buffer.

DETAILED DESCRIPTION OF THE FIGURES

Figure 1:
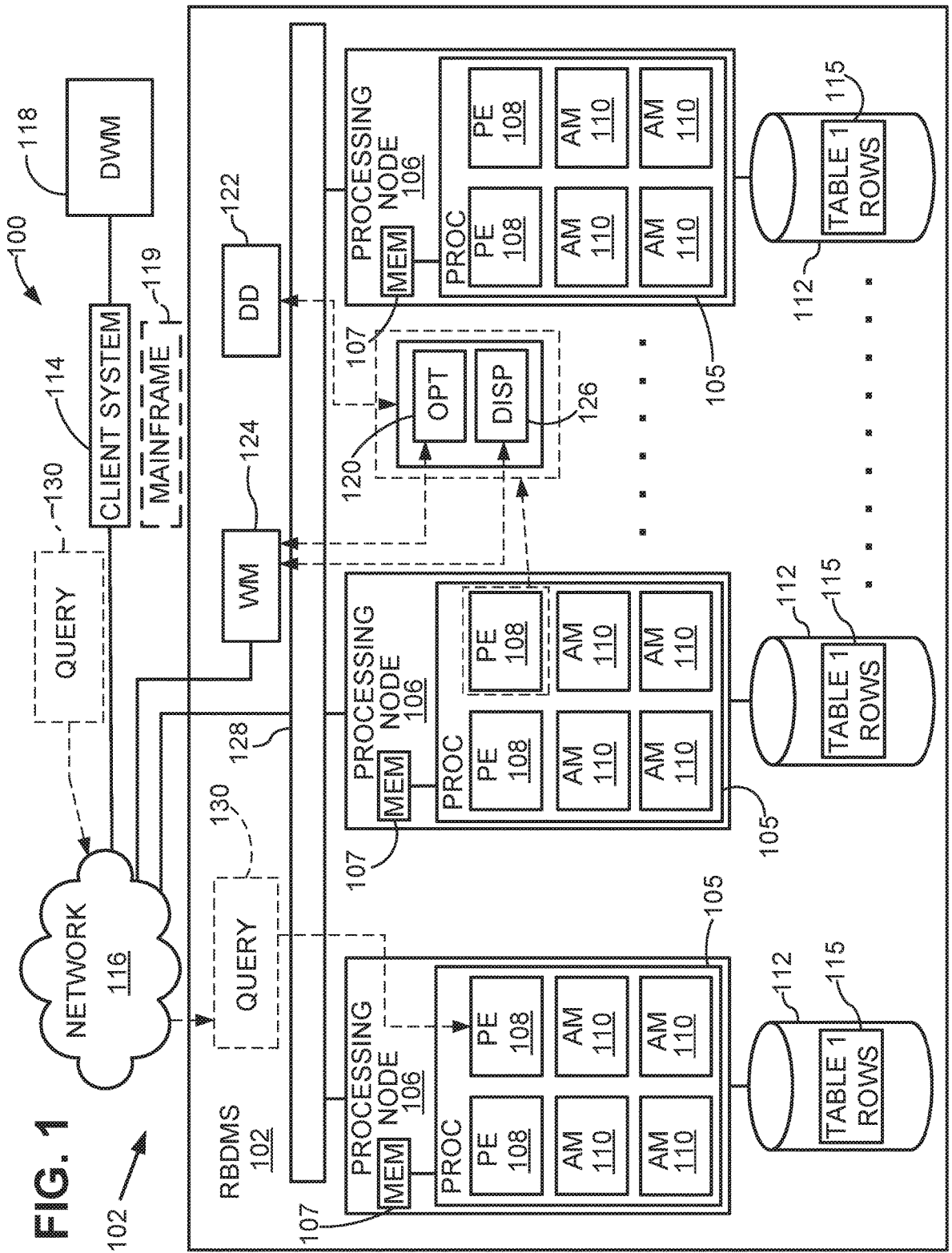
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, a module, such as the parsing engine modules 108 and access modules 110, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 107, for example, that comprises instructions executable with the processor 105 or other processor to implement one or more of the features of the module. When any one of the module includes the portion of the memory that comprises instructions executable with the processor, the module may or may not include the processor. In some examples, each module may just be the portion of the memory 107 or other physical memory that comprises instructions executable with the processor 105 or other processor to implement the features of the corresponding module without the module including any other hardware. Because each module includes at least some hardware even when the included hardware comprises software, each module may be interchangeably referred to as a hardware module, such as the parsing engine hardware module or the access hardware module. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 105 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RDBMS 102 may include a workload management (WM) module 124, which in one example may be Teradata Active System Management. The WM module 124 may be implemented as a "closed-loop" system management (CLSM) architecture capable of satisfying a set of workload-specific goals. In other words, the RDBMS 102 is a goal-oriented workload management system capable of supporting complex workloads and capable of self-adjusting to various types of workloads. The WM module 124 may communicate with each optimizer module 120, as shown in FIG. 1, and is adapted to convey a confidence threshold parameter and associated parameters to the optimizer module 120 in communication. Further, the WM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the WM module 124 via the network 116.

The WM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the WM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
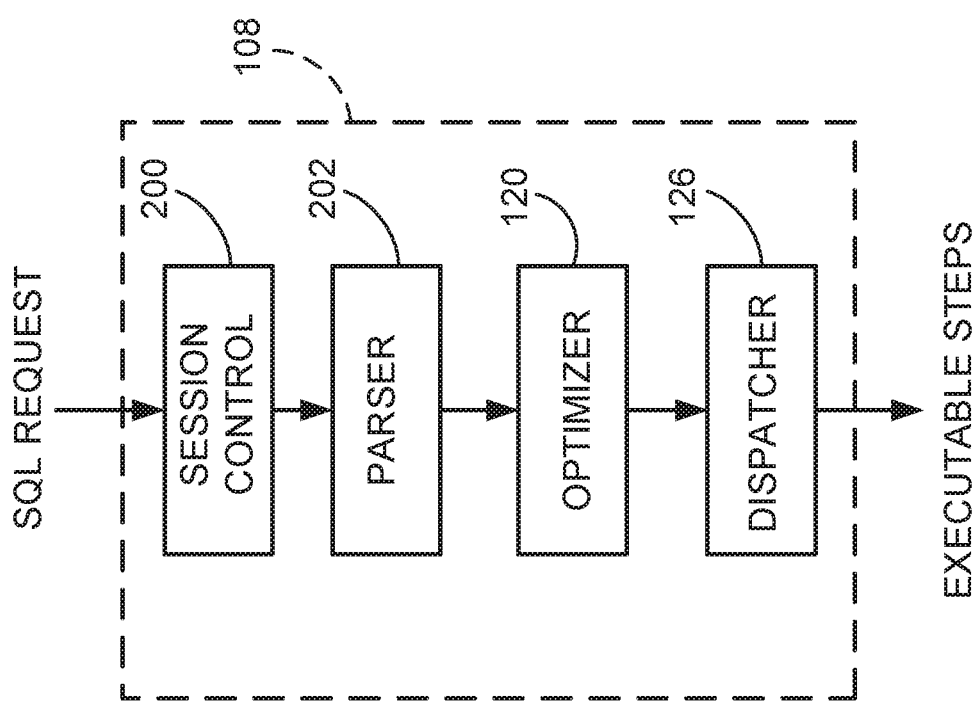
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
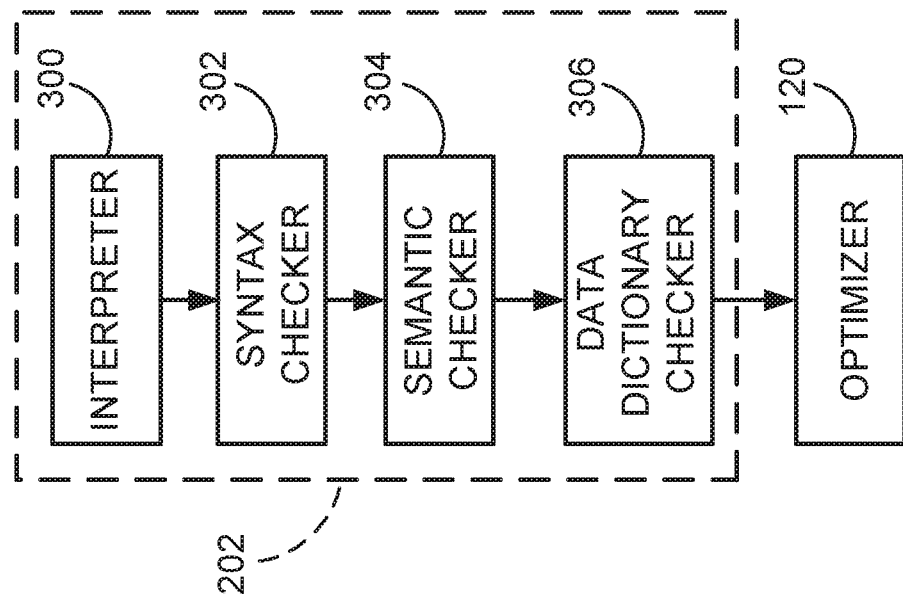
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the WM 124 is configured to monitor runtime exception criteria. The WM 124 monitoring takes place by communicating with the dispatcher module 126 as it checks the query execution step responses from the access modules 110. The step responses include the actual cost information, which the dispatcher module 126 may then communicate to the WM 124 which, in turn, compares the actual cost information with the estimated costs of the optimizer module 120.

Database statistics may be gathered on various database tables in order to assist the optimizer 120 during query planning. In one example, the statistics may be gathered during specific times, such as a period of low-use of the database when excess system resources may be available. Gathering of the statistics prior to query processing allows the RDBMS 102 to access the statistics during query planning to reduce the time required to optimize the query response via the optimizer 120. Two such statistics that provide valuable information are the number of unique values in a column (NUV) and the high mode frequency (HMF), which represents the greatest frequency of a particular column value in a column. When such statistics are gathered, buffers may be used to temporarily maintain values of a column under analysis until the statistics are determined. However, due the varying sizes of values that may be present in particular columns, the buffers may not have enough space to support column values allowing for a proper analysis.

In one example, the RDBMS 102 may use a column hash function to generate hash values for column values of a column under statistical analysis. The column hash function may include a specific hash domain, which includes a finite range of hash values that may be generated. Each column value may be provided as input to the column hash function with a hash value being output. Use of the hash value allows a single-pass through multiple columns of a table on which statistics may be gathered. A single-pass approach with hash values allows less system resources to be used since a hash value is generated for a column value and the hash value is either kept or discarded at the time of creation. Once a hash value has been discarded, it is no longer maintained, and thus, the hash value contributes to the statistics a single time or it is disregarded.

FIG. 4 is an example of an NUV buffer 400 that may be maintained by the RDBMS 102 during statistics collection to determine the NUV of a particular column. In one example, the NUV buffer 400 may include a hash value field 402, frequency field 404, and a fingerprint (FP) value field 406. The NUV buffer 400 may include a maximum number of rows n. In one example, a column hash function may be used to generate a hash value for each column value in a column of a table under analysis. The column hash function may have a bounded output range, which limits the number of hash values generated to a specific number. Initially, the NUV buffer 400 may begin with an NUV domain that covers the entire range of possible hash values. In one example, the initial NUV domain range may be 0 to FFFFFFFF.

The hash value field 402 of the NUV buffer 400 may be populated with each hash value (HV) that falls within in the NUV domain. The frequency field 404 may indicate the number of times a corresponding hash value is generated with the column hash function. FIG. 4 indicates a hash value frequency FREQ(HV1) through FREQ(HVn) for each possible hash value HV1 through HVn. In some examples, a column under analysis may include more rows than possible outputs of the column hash function, which can result in a hash collision. To avoid problems with hash collisions, the FP field 406 may be implemented. In one example, a "fingerprint" value may be generated for hash values falling within a "fingerprint domain". The size of the fingerprint domain may be selected based on the size of the initial NUV domain and the size of the NUV buffer 400. These sizes may be considered along with a particular tolerance for a probability of hash collision occurring. For example, the fingerprint domain may initially be set to a range of 0 to 0003FFFF based on the hash domain of 0 to FFFFFFFF with an NUV maximum buffer size of 512 hash values. In FIG. 4, each hash value is shown as having a corresponding fingerprint value, such as FP value FP(HV1) for hash value HV1, for example. However, if a hash value is not in the fingerprint domain, no FP value is generated.

During operation, the NUV buffer 400 may become full if more than n unique hash values and, if applicable, FP value combinations, are generated, which can result in overflow. In such an example, the NUV domain may be "folded," which, in one example, may include reducing the NUV domain by a factor of one-half from its current range. The reduction may be performed by discarding all hash values, and any corresponding values, in the top half of the current NUV domain. Thus, in the example NUV domain of 0 to FFFFFFFF, the first folding of the NUV domain reduces the NUV domain range maximum 7FFFFFFF and discards any hash values in the NUV buffer 400 greater than 7FFFFFFF. Thus, each time the NUV buffer 400 becomes too full to accept additional hash values, the NUV domain may be folded, which in one example may include discarding hash values in the top half of the current NUV domain and reducing the NUV domain range to half of the current range. In other examples, the domain range reduction may occur based at other rates, such as one-third or one-fourth, for example. The folding may occur each time the NUV buffer 400 becomes full and another new hash value within the current NUV domain is generated. Once the NUV domain has folded such that the maximum value of the range becomes equal to or less than the FP domain, the FP domain may also be folded. The FP domain folding may be reduced by the same factor as the NUV domain once FP folding is initiated. In one example, the FP domain range may be set such that it will ultimately correspond with the NUV domain range once the NUV domain range has went through enough foldings. For example, in the scenario in which the NUV domain is initially 0 to FFFFFFFF and is folded each time at a rate of one-half, eventually the upper boundary of the NUV domain range may become 0003FFFF, which is the upper bound of the initial FP domain. From that point on, each time the NUV domain is folded, the FP domain may also be folded at an equal factor of reduction.

The hash-collision risk may be mitigated through use of the FP field 406. In one example, the FP field 406 may be used to determine a collision factor (CF). The collision factor may indicate the number of unique pairs of hash values and FP values in the NUV buffer 400 once all values of a column under analysis have been considered in the statistics collection. Using the collision factor, the NUV for a column under analysis may be expressed as:

$$NUV = CF * nuh * (SHD/shd) \tag{Eqn. 1}$$

where "nuh" is the final number of unique hash values in the NUV buffer 400 after all column values have been considered, "SHD" is the number of hash values in the initial NUV domain that may be generated by the column hash function, and "shd" is the number of hash values in the final NUV domain.

The NUV buffer 400 may also be used to determine the HMF value for a column. In one example, if the NUV buffer 400 does not experience overflow, the HMF value for a column may be the hash value having the highest frequency in the NUV buffer. However, in the event of overflow, a "top-k" buffer 500 may also be used to determine HMF. The top-k buffer 500 may include a hash value field 502 and a hash value frequency field 504. The top-k buffer 500 may include the top k hash value frequencies that are not contained in the NUV domain, where k is a constant maximum value. Once the top-k buffer 500 is initially filled, a hash value and associated frequency may only be replaced by a hash value frequency of equal or greater number. In the scenario in which the top-k buffer is full and a hash value is eligible for inclusion into the top-k buffer 500, but has a frequency equal to the lowest frequency of a different hash value already present in the top-k buffer 500, the hash value already present in the top-k buffer 500 may be replaced by the new frequency. In the scenario in which multiple hash values present in the top-k buffer have frequencies equal to the frequency of the new hash value, the lowest hash value of those present in the top-k buffer 500 may be replaced by the new hash value. In other examples, various top-k buffer policies may be implemented. For example, each new hash value may replace the hash value of the lowest frequency in the top-k buffer 500, regardless of the value of the lowest frequency. Other examples may include use of an additional buffer to collect frequencies of a new value, which may replace the lowest frequency value by the new value strictly when the new value has a frequency higher than the lowest frequency currently in the top-k buffer 500.

Each time the NUV buffer 400 requires folding, the hash values, and any corresponding values, of the NUV buffer 400 discarded resulting from the folding may be compared to those hash values currently populating the top-k buffer 500, and the top-k buffer 500 may be updated accordingly. Thus, the top-k buffer 500 may initially be empty until the first folding of the NUV buffer 400 occurs. Once all values of a column under analysis are considered, a first HMF value ($HMF_1$) may be expressed as:

$$HMF_1=MAX(\text{highest frequency present in NUV buffer, highest frequency in the top-}K\text{ buffer}) \quad \text{(Eqn. 2)}$$

Since this determination of $HMF_1$ is an estimation, the highest frequency value in the NUV buffer at minimum provides a frequency that is certain to be within the current NUV domain, which indicates the actual $HMF_1$ is at a minimum the highest frequency in the NUV buffer 400. Thus, the value in the top-K buffer 500 may indicate a higher value for $HMF_1$, which attempts to avoid underestimation of $HMF_1$.

The $HMF_1$ value may be used to mitigate the effects of possible underestimation. A second HMF value ($HMF_2$) may also be determined in order to reinforce avoidance of underestimation. FIG. 6 is an example of a sketch buffer 600 that may be used to determine $HMF_2$. In one example, the sketch buffer 600 may include m non-overlapping hash value range groups in a hash value range group field 602 that cover the initial NUV domain, designated s HV-RG1 through HV-RGm in FIG. 6. The sketch buffer 600 also includes a range group frequency field 604, which includes a corresponding value for each frequency range group of the field 602. Each value in the field 604 indicates the number of hash values falling within the corresponding range group frequency in field 602. For example, the frequency FREQ-RG1 corresponds to the frequency range group HV-RG1. As each hash value is determined, the sum of range group frequencies in field 604 corresponding to the range group 602 in which the hash value falls may be updated. In one example, the m hash value range groups each span equal amounts of the entire initial hash domain. In such examples, the field 602 may not be part of the sketch buffer and each range group frequency may be located through an algorithmic determination based on the initial NUV domain and the knowledge that the frequency range groups span equal numbers of hash values. Once all of the column values of the column under analysis are considered, various metrics may be gathered based on the contents of both the NUV buffer 400 and the sketch buffer 600. These metrics may include:

GrpFreqArr[x]: Sorted sketch buffer 600 in ascending order of the number of frequency values in each of the x frequency range groups, where x is the index of the GrpFreqArr array.

NUV: The final number of unique hash values in the NUV buffer 400;

NumGrps: The number of frequency ranges in the GrpFrqArr array having frequency values greater greater than 0;

$$VPG(\text{Value Per Group})=(\text{Final number of unique hash values in the NUV buffer 400})/\text{NumGrps}; \quad \text{(Eqn. 3)}$$

MaxGrpFreq: Greatest frequency value in GrpFreqArr array;

MinGrpFreq: Smallest group frequency in GrpFreqArr array;

MedGrpFreq: Median group frequency in GrpFreqArr array; and

MaxNonSkewGrpFreq: Greatest frequency range value among non-skewed group frequencies.

A frequency range group may be considered a "skewed" group frequency if the frequency value is significantly higher than other range frequency values. A group frequency may be considered a "non-skewed" group frequency if the frequency is not a skewed group frequency. Given GrpFreqArr [x], MaxNonSkewGrpFreq is the GrpFreqArr[i], where "i" is the smallest among the values satisfying the following conditions:

$$\text{GrpFreqArr}[i+1]-\text{GrpFreqArr}[i]>\text{MedGrpFreq; and} \quad \text{(Eqn. 4)}$$

$$i>(x/2) \text{ and } i<(x-1). \quad \text{(Eqn. 5)}$$

where "i+1" represents the next lowest frequency range value in the sketch buffer 600.

These values and expressions may be used to define criteria for determining $HMF_2$. The value of $HMF_2$. For example, the distribution of frequencies in the GrpFreqArr array may be considered a "uniform distribution" if:

$$\text{MaxGrpFreq}-\text{MinGrpFreq}<\text{sqrt}(NUV*RPV) \quad \text{(Eqn. 6)}$$

where RPV is the rows per unique value of each hash value in the NUV buffer 400

If Eqn. 6 is true, then $HMF_2$ may be expressed as:

$$HMF_2=\text{MaxGrpFreq}/\text{VPG} \quad \text{(Eqn. 7)}.$$

The distribution of frequencies in the GrpFreqArr array may be considered a "skewed distribution" if:

$$\text{MaxNonSkewGrpFreq}>\text{MedGrpFreq} \quad \text{(Eqn. 8)}.$$

If Eqn. 8 is true, then $HMF_2$ may be defined as:

$$\text{MaxGrpFreq}-(VPG-1)*(\text{MaxNonSkewGrpFreq}/VPG) \quad \text{(Eqn. 9)}.$$

As part of the assumptions made in one-pass statistics collection, the column hash function is expected to generate hash values equally across the entire hash domain, with no concentration to a certain portion of domain. So, after an entire domain is partitioned into several groups, it may be assumed that each hash range group has more or less the same number of unique values. However, in practical application, this assumption is likely to be untrue, especially when there are a small number of unique values in a column. Some hash value range groups could have more unique values than others have, or some groups have less unique values than others have. The general distribution may be considered to have an uneven number of unique values per group if this is case. The distribution of frequencies in the GrpFreqArr array may be considered a "general distribution with an uneven number of unique values per group" if:

$$\text{GrpFreqArr}[0]==0 \quad \text{(Eqn. 10)}.$$

Eqn. 10 may indicate that since the GrpFreqArr array group having the lowest frequency is zero, there can be no true evenness. In such a situation, the NUV value may small enough that the differences in values a frequency groups is significantly impactful on the estimation of $HMF_2$. If Eqn. 10 is true, then $HMF_2$ may be defined as:

$$\text{MaxGrpFreq}/\text{VPG} \quad \text{(Eqn. 11)}.$$

Conversely, in one example, the distribution of frequencies in the GrpFreqArr array may be considered a "general distribution with even number of unique values per group" if:

$$\text{GrpFreqArr}[0]>0 \quad \text{(Eqn. 12)}.$$

If Eqn. 12 is true, then $HMF_2$ may be defined as:

$$\text{MaxGrpFreq}-(VPG-1)*(\text{MedGrpFreq}/VPG) \quad \text{(Eqn. 13)}.$$

The RDBMS 102 may consider the criteria in the order described, and thus, may determine if the distributions described by Eqns. 6, 8, 10, and 12 are true in that order in determining $HMF_2$.

Once the $HMF_1$ and $HMF_2$ values are determined, the HMF value for the column under analysis may be determined by:

$$HMF=MAX(HMF_1,HMF_2) \quad \text{(Eqn. 14)}$$

Figure 7:
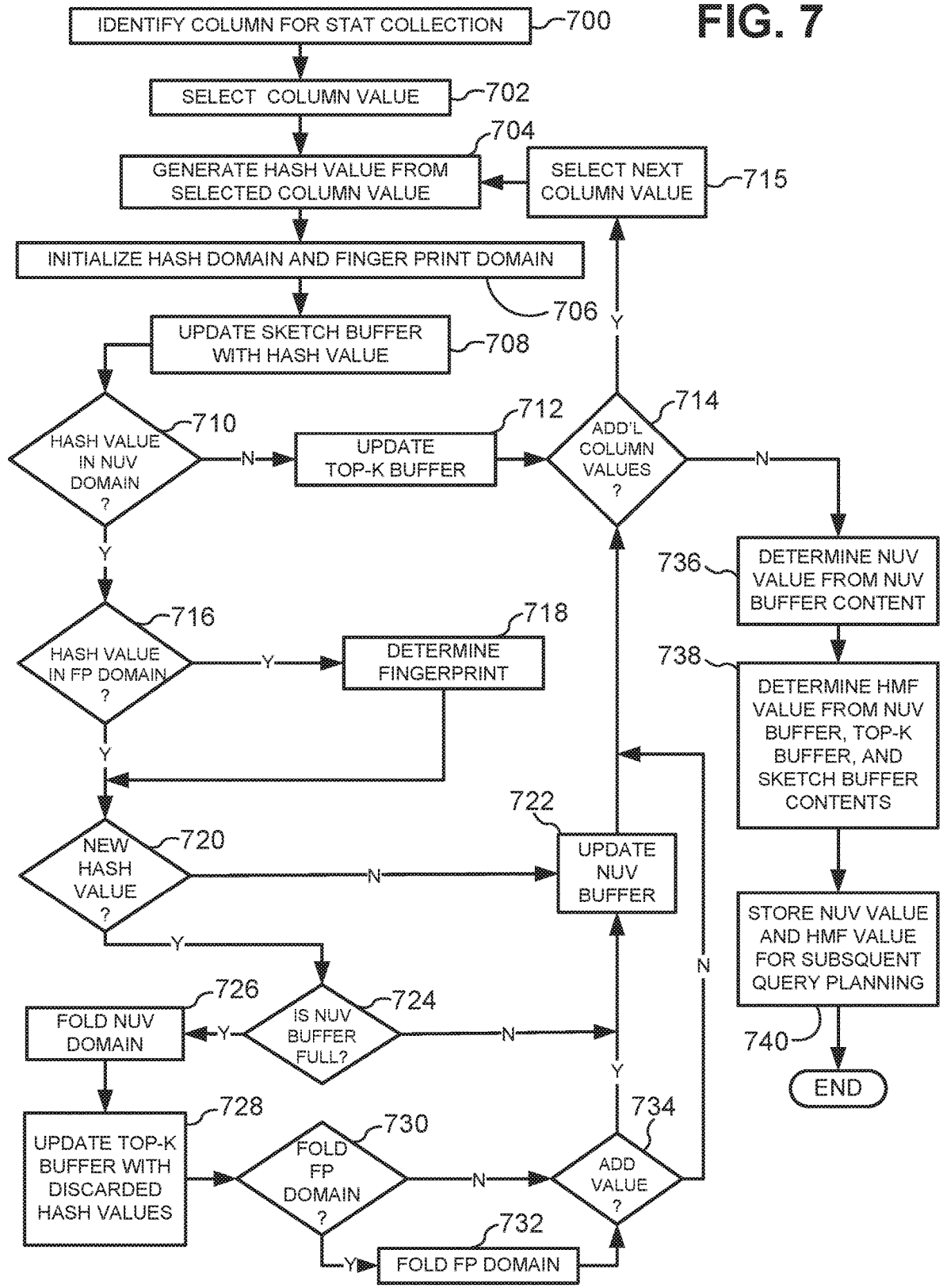
FIG. 7 is an operational flow diagram of an example database system during statistics collection.

FIG. 7 is an operational flow diagram during statistics collection on a column of a database table by the RDBMS 102. In one example, the RDBMS 102 may identify a column for statistics collection (700). The RDBMS 102 may select a column value from the column under analysis (702). The RDBMS 102 may generate a hash value for the column value according to the particular column hash function being implemented (704). The RDBMS 102 may initialize the hash domain and fingerprint domain (706). In other examples, the initial hash domain and the fingerprint domain may be initialized prior to statistics collection or may rely on default parameters.

The RDBMS 102 may update the sketch buffer 600 with the hash value by incrementing the range group frequency in field 604 corresponding to the particular frequency range group in field 602 in which the hash value falls (708). The RDBMS 102 may determine if the hash value is in the NUV domain (710). Until the NUV domain is folded for the first time, all hash values may be in the NUV domain. However, when the hash value is not in the hash domain, the top-k buffer 500 may be updated (712). If the top-k buffer 500 is updated, the RDBMS 102 may determine if additional column values exist (714). If so, the next column value may be selected (715) and hash value generated (704).

If the current hash value is determined to be in the NUV domain (710), the RDBMS 102 may determine if the current hash value is in the fingerprint domain (716). If so, the FP value may be determined (718). Once the FP value is determined, or if the current hash value is not in the FP domain, the RDBMS 102 may determine if the current hash value is a new value (720), which, if so, indicates the hash value, and FP value if applicable, are not in the NUV buffer 400. If the current hash value is in the NUV buffer 400, the frequency field of the NUV buffer 400 may be updated by incrementing the frequency in the frequency field 404 for the corresponding hash value in the hash value field 402 and the RDBMS 102 may determine if additional column values are present (714).

If the current hash value is a new value and the NUV buffer 400 is full, the NUV domain may be folded (726). In one example, the NUV domain may be folded by a factor of one-half, but, in other examples, other reduction factors and techniques may be used. Once the NUV domain is folded, any hash values being discarded may be compared to the contents of the top-k buffer 500 in order to update the top-k buffer 500 (728). In one example, the frequencies of hash values being discarded from folding of the NUV domain may be added to the top-k buffer 500, if any frequencies are greater than those currently in the top-k buffer 500.

The RDBMS 102 may determine if the FP domain is to be folded (730). In one example, if the NUV domain is folded to a hash value range less than the FP domain, the FP domain may be folded as well. In some examples, the FP domain may be folded at a rate equal to that used to fold the NUV domain. If the FP domain is to be folded, the RDBMS 102 may perform the folding of the FP domain (732). Once the FP domain is considered, the RDBMS 102 may determine if the current hash value remains in the NUV domain after the NUV folding at (726). If the value is to be added, the NUV buffer 400 may be updated to include the current hash value and may include the FP value, if applicable (722). If the value is not to be included in the NUV buffer 400, the RDBMS 102 may determine if additional column values exist in the column under analysis for consideration (714). The RDBMS 102 may consider each column value in the column under analysis until all column values have been considered. If the RDBMS 102 determines no additional column values exist, the RDBMS may determine the NUV value of the column under analysis (736). In one example, the NUV value may be determined according to Eqn. 1.

The RDBMS 102 may determine the HMF value of the column under analysis using the contents of the NUV buffer 400, the top-k buffer 500, and the sketch buffer 600 (738). In one example, the HMF value may be found in accordance with Eqns. 2-14. Once the NUV and HMF values are determined, they may be stored for subsequent query planning (740).

Figure 8:
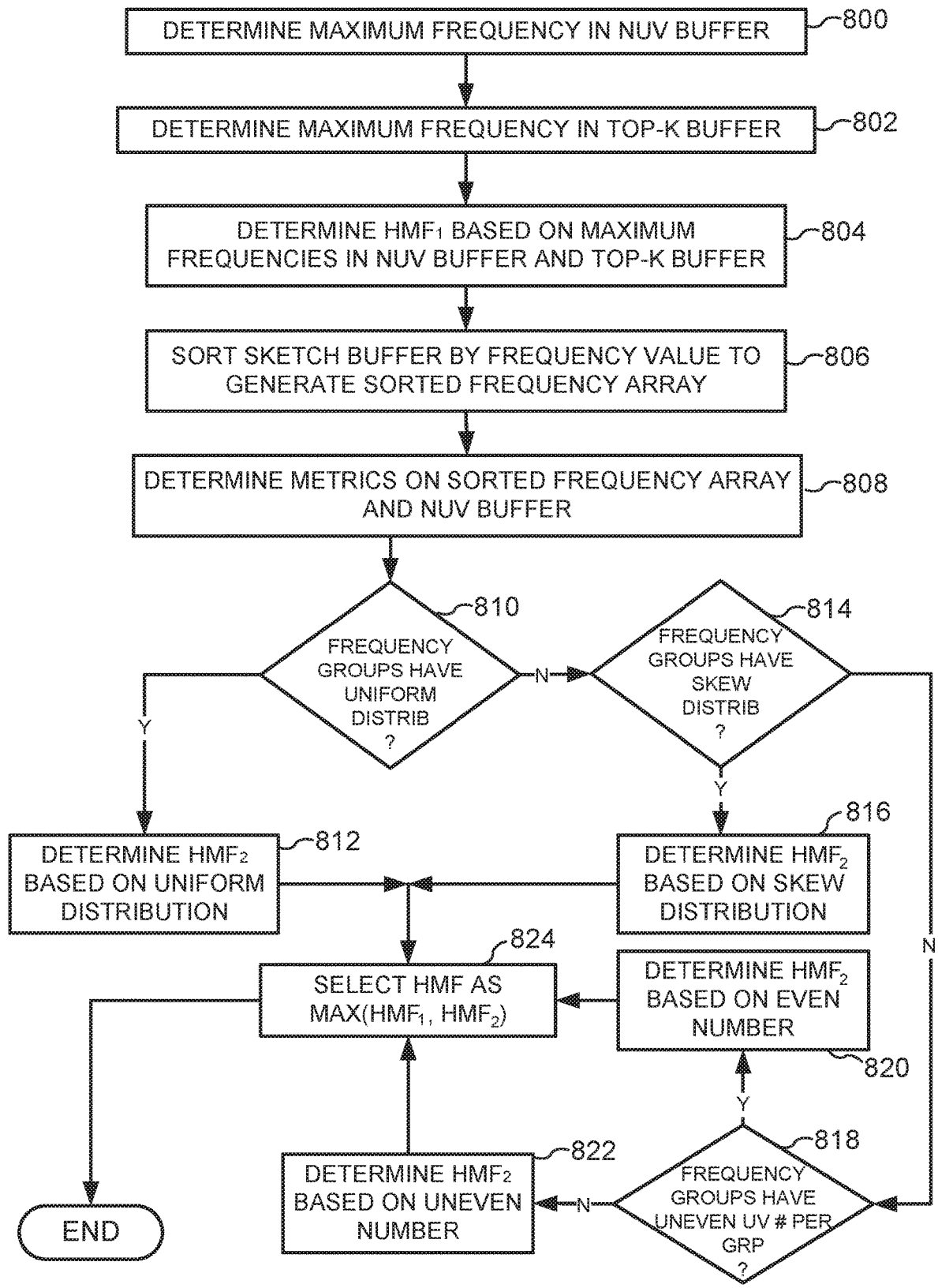
FIG. 8 is another operational flow diagram of an example database system during statistics collection.

FIG. 8 is an expanded example of a determination of the HMF value, such as that performed in (738). In one example, the RDMBS 102 may determine the maximum frequency in the NUV buffer 400 (800). The RDBMS 102 may determine the maximum frequency in the top-k buffer 500 (802). The RDBMS 102 may determine the $HMF_1$ value from the maximum frequencies in the NUV buffer 400 and the top-k buffer 500. In one example, $HMF_1$ may be determined according to Eqn. 2. If the NUV domain has not been folded, the top-K buffer 500 is empty and $HMF_1$ will be maximum frequency in the NUV buffer 400.

The RDBMS 102 may sort the sketch buffer range group frequencies in field 604 in ascending order to generate the GrpFreqArr array (806). The RDBMS 102 may determine various metrics on the NUV buffer 400 and the GrpFreqArr array. In one example, the metrics may include NUV, NumGrps, VPG, MaxGrpFreq, MinGrpFreq, MedGrpFreq, and MaxNonSkewGrpFreq, for example. Once the metrics are determined, the RDBMS 102 may determine if the frequency groups in the GrpFreqArray have a uniform distribution (810). In one example, this may be determined according to Eqns. 6. If a uniform distribution is determined, the RDBMS 102 may determine the $HMF_2$ value for a uniform distribution (812), which, in one example, may be found according to Eqn. 7. If the frequency groups do not have a uniform distribution, the RDBMS 102 may determine if the frequency groups of have a skewed distribution (814). In one example, this may be determined through Eqn. 8. If a skewed distribution exists, the RDBMS 102 may determine the $HMF_2$ value for a skewed distribution (816), which, in one example, may be found according to Eqn. 9. If the frequency groups do not have a skewed distribution, the RDBMS 102 may determine if the frequency groups of have a general distribution with an uneven number of unique values per group (818). In one example, this may be determined through Eqn. 10. If the frequency groups have a general distribution with an uneven number of unique values per group exists, the RDBMS 102 may determine the $HMF_2$ value for such a distribution (820), which, in one example, may be found according to Eqn. 11. If the frequency groups do not have a general distribution with an uneven number of unique values per group (818), then, by default, the frequency groups may be considered to have a general distribution with an even number of unique values per group. If the frequency groups have a general distribution with an even number of unique values per group exists, the RDBMS 102 may determine the $HMF_2$ value for such a distribution (822), which, in one example, may be found according to Eqn. 13. Once the RDBMS 102 determines the $HMF_2$ value at (812), (816), (820), or (822), the RDBMS 102 may determine the HMF value by selected the maximum of $HMF_1$ and $HMF_2$ (824).

The examples herein have been provided with the context of a relational database system. However, all examples are applicable to various types of data stores, such as file systems or other data stores suitable for organization and processing of data. Moreover, additional or fewer operations of the operational flow diagrams may be implemented in some examples and the orders may be changed in some examples. While various embodiments of the invention have been described, it will be apparent to those of ordinary skill in the art that many more examples and implementations are possible within the scope of the invention. Accordingly, the invention is not to be restricted except in light of the attached claims and their equivalents.

I claim:

1. A data store system comprising:
   an array of persistent storage devices configured to store a plurality of data stare tables;
   a processor in communication with the array of persistent storage devices, the processor configured to:
   select a column of a data store table for statistics collection;
   for each column value in the selected column, generate a hash value based on a hash function;
   select a first domain of hash values and a second domain of hash values, wherein the second domain is a subset of the first domain;
   determine a frequency value for each generated hash value within the first domain;
   generate a unique identifier for each hash value that is within the second domain;
   determine at least one statistic on the selected column based on the frequency values and the unique identifiers; and
   store the at least one statistic for use in a query plan.

2. The data store system of claim 1, wherein the frequency values and unique identifiers are maintained in a first buffer, wherein the processor is further configured to:
   determine that the first buffer is full during generation of the hash values;
   reduce a size of the first domain; and
   remove all frequency values and corresponding unique identifiers for each associated hash value that is outside of the reduced first domain.

3. The system of claim 2, wherein the second domain is reduced by a common factor with the first domain when the first domain becomes equal to or smaller than the second domain.

4. The system of claim 2, wherein the at least one statistic is a number of unique values for the selected column, wherein the number of unique values is based on a total number of hash values contained in the first buffer, a number of unique hash value and unique identifier pairs, initial number of hash values in the first domain, and a number of hash values of the first domain after a hash value has been generated for column value in the selected column.

5. The system of claim 1, wherein the at least one statistic is high mode frequency of the selected column, and wherein the processor is further configured to:
   maintain a first buffer, wherein the first buffer includes a plurality of non-overlapping hash value range groups that span an initial hash value domain; and
   determine the high mode frequency based on contents of the second buffer.

6. The system of claim 1, wherein the at least one statistic is high mode frequency of the selected column, and wherein the processor is further configured to:
   maintain a first buffer, wherein the first buffer includes predetermined number of frequency values of generated hash values; and
   determine the high mode frequency based on the contents of the second buffer and the number of unique values.

7. The system of claim 1, wherein each unique identifier associated with a respective hash value is based on a column value corresponding to the respective hash value.

8. A method comprising:
   selecting a column of a data store table for statistics collection;
   for each column value in the selected column, generating a hash value based on a hash function;
   selecting a first domain of hash values and a second domain of hash values, wherein the second domain is a subset of the first domain;
   determining a frequency value for each generated hash value within the first domain;
   generating a unique identifier for each hash value that is within the second domain;
   determining at least one statistic on the selected column based on the frequency values and the unique identifiers; and
   storing the at least one statistic for query planning.

9. The method of 8, further comprising:
   maintaining a first buffer to contain the frequency values and unique identifiers;
   determining that the first buffer is full during generation of the hash values;
   reducing a size of the first domain; and
   removing all frequency values and corresponding unique identifiers for each associated hash value that is outside of the reduced first domain.

10. The method claim 9, further comprising reducing the second domain by a common factor with the first domain when the first domain becomes equal to or smaller than the second domain.

11. The method of claim 9, wherein determining the at least one statistic comprises determining a number of unique values for the selected column, wherein the number of unique values is based on a total number of hash values contained in the first buffer, a number of unique hash value and unique identifier pairs, initial number of hash values in the first domain, and a number of hash values of the first domain after a hash value has been generated for column value in the selected column.

12. The method claim 8, wherein determining the at least one statistic comprises determining high mode frequency for the selected column, the method further comprising:
   maintaining a first buffer, wherein the first buffer includes a plurality of non-overlapping hash value range groups that span an initial hash value domain; and
   determining the high mode frequency based on contents of the second buffer.

13. The method claim 8, wherein determining the at least one statistic comprises determining high mode frequency for the selected column, the method further comprising:
   maintaining a first buffer, wherein the first buffer includes predetermined number of frequency values of generated hash values; and
   determining the high mode frequency based on the contents of the second buffer and the number of unique values.

14. The method of claim 8, wherein generating a unique identifier for each hash value comprises generating a unique identifier associated with a respective hash value based on a column value corresponding to the respective hash value.

15. A computer-readable medium encoded with a plurality of
   instructions executable by a processor, the plurality of instructions comprising:

instructions to select a column of a data store table for statistics collection;

instructions to generate, for each column value in the selected column, a hash value based on a hash function;

instructions to select a first domain of hash values and a second domain of hash values, wherein the second domain is a subset of the first domain;

instructions to determine a frequency value for each generated hash value within the first domain;

instructions to generate a unique identifier for each hash value that is within the second domain;

instructions to determine at least one statistic on the selected column based on the frequency values and the unique identifiers; and instructions to store the at least one statistic for query planning.

16. The computer-readable medium of claim 15, wherein the plurality of instructions further comprises:

instructions to maintain a first buffer to contain the frequency values and unique identifiers;

instructions to determine that the first buffer is full during generation of the of the has values;

instructions to reduce a size of the first domain; and instructions to remove all frequency values and corresponding unique identifiers for each associated hash value that is outside of the reduced first domain.

17. The computer-readable medium of claim 16, wherein the plurality of instructions further comprises instructions to reduce the second domain by a common factor with the first domain when the first domain becomes equal to or smaller than the second domain.

18. The computer-readable medium of claim 16, wherein the instructions to determine the at least one statistic comprise instructions to determine a number of unique values for the selected column based on a total number of hash values contained in the first buffer, a number of unique hash value and unique identifier pairs, initial number of hash values in the first domain, and a number of hash values of the first domain after a hash value has been generated for column value in the selected column.

19. The computer-readable medium of claim 15, wherein the instructions to determine the at least one statistic comprise instructions to determine high mode frequency for the selected column, and wherein the plurality of instructions further comprised:

instructions to maintain a first buffer, wherein the first buffer includes a plurality of non-overlapping hash value range groups that span an initial hash value domain; and instructions to determine the high mode frequency based on contents of the second buffer.

20. The computer-readable medium of claim 15, wherein the instructions to determine the at least one statistic comprise instructions to determine high mode frequency for the selected column, and wherein the plurality of instructions further comprised:

instructions to maintain a first buffer, wherein the first buffer includes predetermined number of frequency values of generated hash values; and instructions to determine the high mode frequency based on the contents of the second buffer and the number of unique values.

* * * * *